United States Patent
Campbell et al.

(10) Patent No.: US 9,845,679 B2
(45) Date of Patent: Dec. 19, 2017

(54) PORT PLATE ASSEMBLY FOR HYDRAULIC UNIT

(71) Applicant: Hamilton Sundstrand Corporation, Charlotte, NC (US)

(72) Inventors: Kris H. Campbell, Poplar Grove, IL (US); Glenn C. Lemmers, Jr., Loves Park, IL (US); Doren C. Smith, Rockford, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 405 days.

(21) Appl. No.: 14/661,330

(22) Filed: Mar. 18, 2015

(65) Prior Publication Data
US 2016/0273359 A1    Sep. 22, 2016

(51) Int. Cl.
| | |
|---|---|
| F01B 3/00 | (2006.01) |
| F16H 39/14 | (2006.01) |
| F04B 1/20 | (2006.01) |
| F03C 1/34 | (2006.01) |

(52) U.S. Cl.
CPC .......... *F01B 3/0055* (2013.01); *F01B 3/00* (2013.01); *F01B 3/007* (2013.01); *F03C 1/0655* (2013.01); *F04B 1/2042* (2013.01); *F16H 39/14* (2013.01)

(58) Field of Classification Search
CPC ..... F04B 1/2042; F01B 3/0055; F03C 1/0655
USPC .................................................. 60/487, 488
See application file for complete search history.

(56) References Cited

U.S. PATENT DOCUMENTS

| | | | | |
|---|---|---|---|---|
| 3,133,418 A | | 5/1964 | Froebe | |
| 5,014,513 A | * | 5/1991 | Sundstrom | F04B 1/2064 138/39 |
| 5,524,785 A | * | 6/1996 | Georges | F16B 37/12 138/96 T |
| 6,082,410 A | * | 7/2000 | Pohar | B65D 59/02 138/89 |

OTHER PUBLICATIONS

European Application No. 16160854.2 Extended European Search Report, dated Aug. 22, 2016, 7 pages.

* cited by examiner

Primary Examiner — Thomas E Lazo
(74) Attorney, Agent, or Firm — Cantor Colburn LLP

(57) ABSTRACT

A port plate assembly of a hydraulic unit includes a port plate and a journal bearing. The port plate includes a fixed-speed interface side having a fixed-speed interface surface, and a variable-speed interface side having a variable-speed interface surface. A plurality of kidney-shaped apertures is defined at a kidney pitch diameter about a central bore of the port plate between the fixed-speed interface surface and the variable-speed interface surface. The port plate also includes control cylinder interface formed at a control cylinder radial offset from a central axis of the central bore, where a ratio of the control cylinder radial offset to the kidney pitch diameter is between 1.629 and 1.639. The journal bearing is installed in the central bore of the port plate, where the journal bearing provides an interface for a fixed-speed shaft and a variable-speed shaft of the hydraulic unit.

14 Claims, 6 Drawing Sheets

PORT PLATE ASSEMBLY FOR HYDRAULIC UNIT

BACKGROUND OF THE INVENTION

Embodiments of this invention generally relate to an integrated drive generator, and more particularly, to a port plate assembly of a hydraulic unit of an integrated drive generator.

Aircraft currently rely on electrical, pneumatic, and hydraulic systems for secondary power. A typical electrical system utilizes an integrated drive generator coupled to each engine of an aircraft to provide fixed frequency power to a power distribution system and associated loads. One type of integrated drive generator includes a generator, a hydraulic unit, and a differential assembly arranged in a common housing. The differential assembly is operably coupled to an aircraft engine, such as a gas turbine engine, via an input shaft. The rotational speed of the input shaft varies during operation of the engine. The hydraulic unit cooperates with the differential assembly to provide a constant speed to the generator throughout engine operation.

Due to engineering designs and requirements, various components of the systems must be designed to operatively function together. For example, various components of the hydraulic unit are configured to appropriately and accurately mate and fit together to enable efficient operation. Constraints such as power, envelope, weight, leakage, operational stresses, environmental stresses, pressure limits, speed limits, material constraints, loads, and the like present a number of design challenges.

BRIEF DESCRIPTION OF THE INVENTION

According to one embodiment of the invention, a port plate assembly of a hydraulic unit includes a port plate and a journal bearing. The port plate includes a fixed-speed interface side having a fixed-speed interface surface, and a variable-speed interface side having a variable-speed interface surface. A plurality of kidney-shaped apertures is defined at a kidney pitch diameter about a central bore of the port plate between the fixed-speed interface surface and the variable-speed interface surface. The port plate also includes control cylinder interface formed at a control cylinder radial offset from a central axis of the central bore, where a ratio of the control cylinder radial offset to the kidney pitch diameter is between 1.629 and 1.639. The journal bearing is installed in the central bore of the port plate, where the journal bearing provides an interface for a fixed-speed shaft and a variable-speed shaft of the hydraulic unit.

A method of installing a port plate assembly in a hydraulic unit includes arranging a first cylinder block assembly of a variable displacement hydraulic pump proximate a variable-speed interface surface of a variable-speed interface side of a port plate of the port plate assembly. A variable-speed shaft is interfaced to a journal bearing in a central bore of the port plate. A second cylinder block assembly of a fixed displacement hydraulic motor is arranged proximate a fixed-speed interface surface of a fixed-speed interface side of the port plate. A plurality of kidney-shaped apertures is defined at a kidney pitch diameter about the central bore between the fixed-speed interface surface and the variable-speed interface surface. A fixed-speed shaft is interfaced to the journal bearing. A control cylinder is coupled to a control cylinder interface formed at a control cylinder radial offset from a central axis of the central bore, where a ratio of the control cylinder radial offset to the kidney pitch diameter is between 1.629 and 1.639.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example, with reference to the drawings.

DETAILED DESCRIPTION OF THE INVENTION

Figure 1:
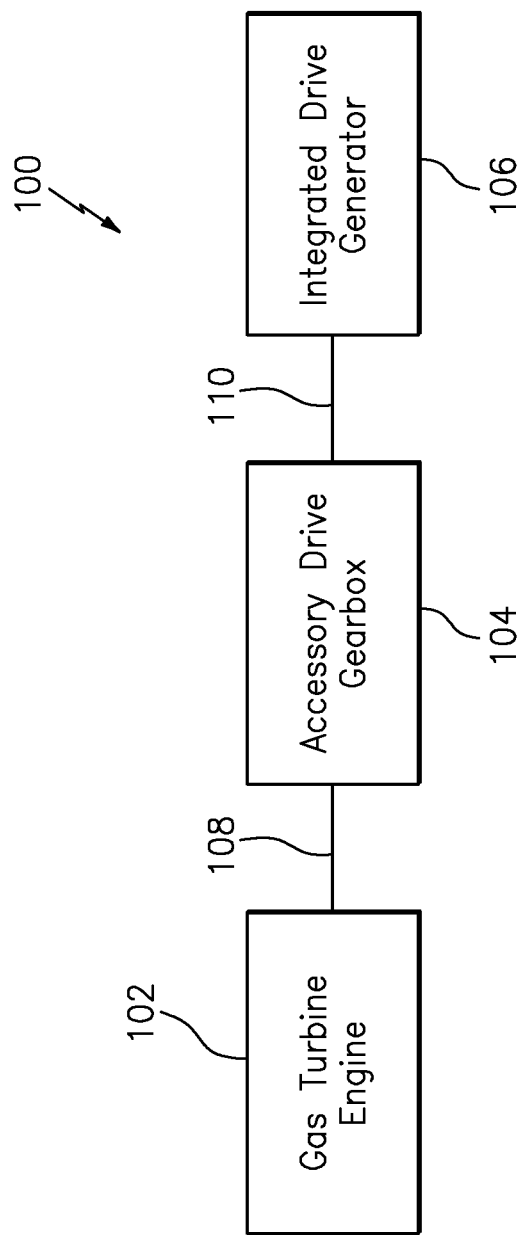
FIG. 1 is a schematic diagram of an exemplary power generator system of an aircraft.

Referring now to FIG. 1, an example of a generator system 100 is schematically illustrated. The generator system 100 includes a gas turbine engine 102 that is configured to rotationally drive an integrated drive generator 106 through an accessory drive gearbox 104 mounted on the gas turbine engine 102. The accessory drive gearbox 104 is coupled to a spool 108 of the gas turbine engine 102, and the speed of the spool 108 varies throughout the entire operation of the gas turbine engine 102, depending on operational characteristics, such as high altitude cruising flight or take-off of an aircraft in which the generator system 100 is installed. An input shaft 110 is configured to transfer rotational energy to the integrated drive generator 106 from the accessory drive gearbox 104. Those skilled in the art will appreciated that the generator system 100 of FIG. 1 directed to an aircraft is merely presented for illustrative and explanatory purposes and other generator systems and/or engines may be used without departing from the scope of the invention.

Figure 2:
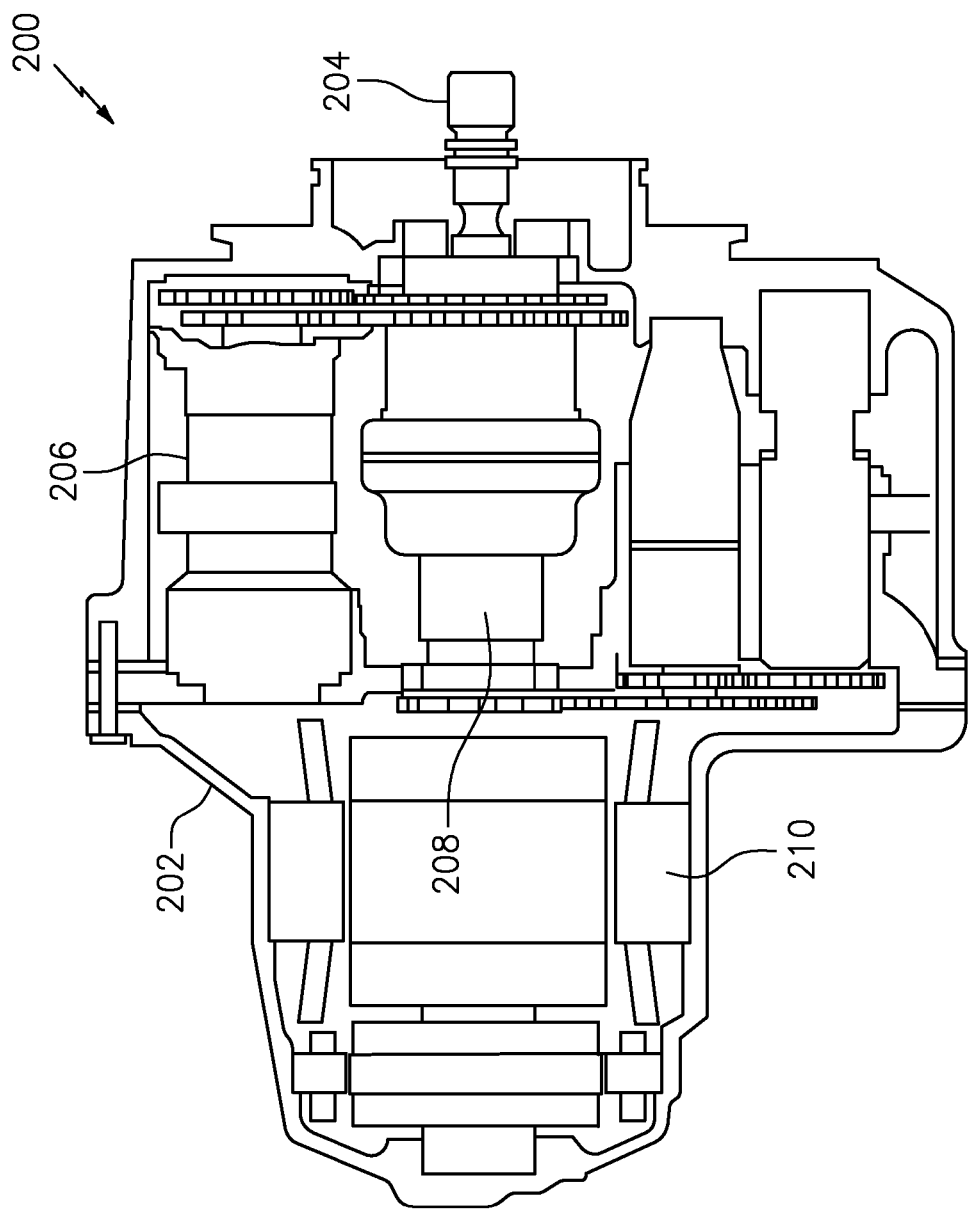
FIG. 2 is a cross-sectional schematic view of an example of an integrated drive generator.

An example of an integrated drive generator 200 including a housing 202 is shown in FIG. 2. In the illustrated embodiment, the integrated drive generator 200 includes an input shaft 204 configured to receive rotational drive from an accessory drive gearbox (see FIG. 1). The rotational speed of the input shaft 204 varies depending upon the operation of the engine (see FIG. 1). To this end, a hydraulic unit 206 cooperates with a differential assembly 208 to convert the variable rotational speed from the input shaft 204 to a fixed rotational output speed that is transferred to a generator 210.

Figure 3:
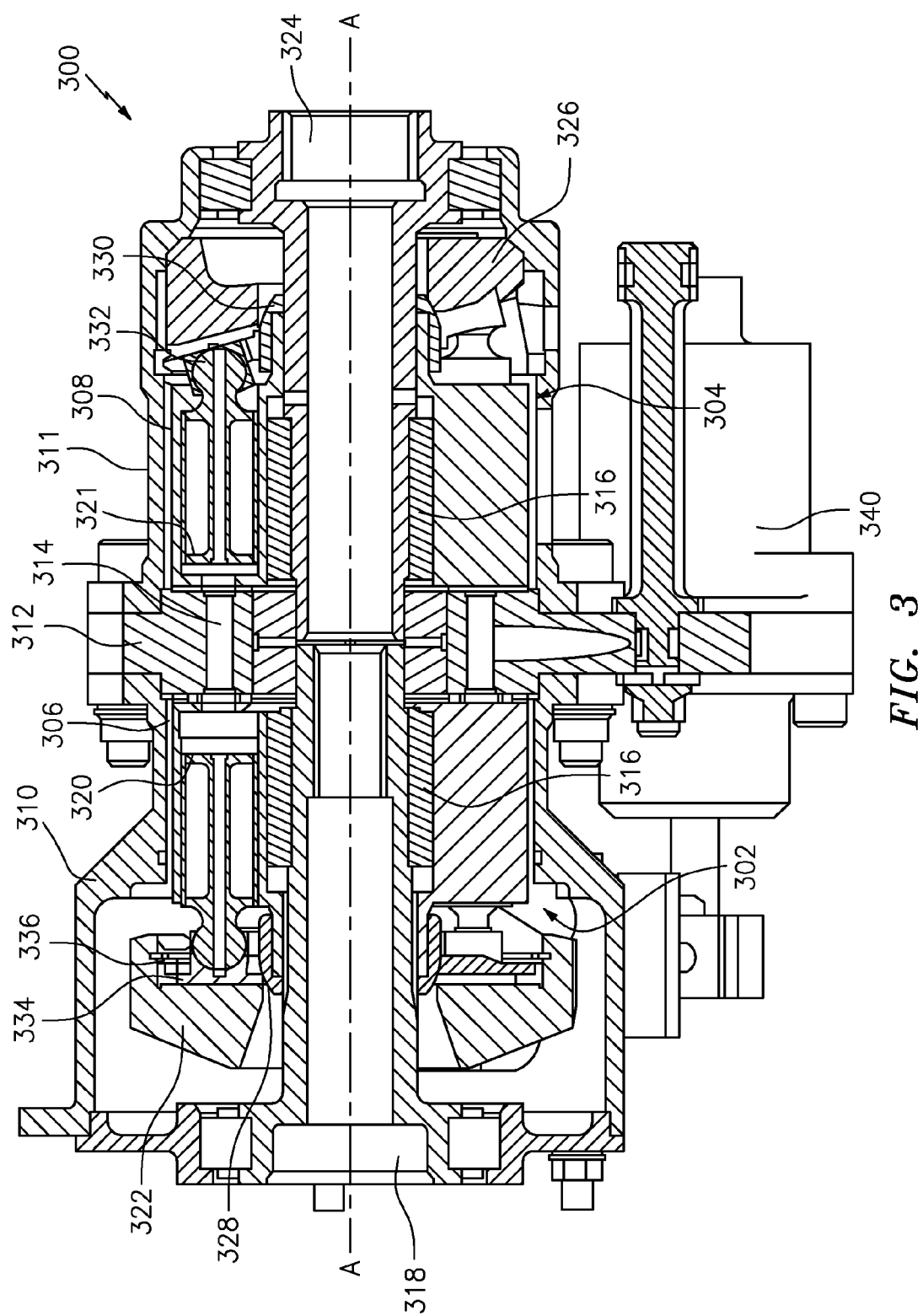
FIG. 3 is a cross-sectional schematic view of an example of a hydraulic unit of an integrated drive generator.

Referring now to FIG. 3, an exemplary embodiment of a hydraulic unit 300 of an integrated drive generator, such as the integrated drive generator 200 of FIG. 2, is shown. The hydraulic unit 300 includes a variable displacement hydraulic pump 302 and a fixed displacement hydraulic motor 304. The variable displacement hydraulic pump 302 and the fixed displacement hydraulic motor 304 have respective cylinder block assemblies 306 and 308 which are arranged for rotation about a common axis A within housings 310, 311 on opposite sides of a stationary port plate assembly 312 of the hydraulic unit 300. The port plate assembly 312 is formed with one or more kidneys or apertures 314 through which hydraulic fluid communication between the pump 302 and the motor 304 is established during normal operation of the hydraulic unit 300. A biasing mechanism 316 resiliently biases the cylinder block assemblies 306, 308 in the direction of the port plate assembly 312.

The operation of the hydraulic unit 300 in an integrated drive generator, for example an integrated drive generator of an aircraft, involves transmission of torque from an engine of the aircraft to an input, which rotates an input shaft 318 of the hydraulic unit 300 about axis A. The cylinder block assembly 306 of the pump 302 is connected to the input shaft 318 for rotation therewith. Pistons 320 within the cylinder block assembly 306 of the pump 302 are displaced during rotation an amount which is a function of the setting of a variable swashplate or wobbler 322 of the pump 302. Pistons 321 within the cylinder block assembly 308 of the motor 304 are displaced during rotation with respect to a fixed swash plate or wobbler 326 of the motor 304. Those of skill in the art will appreciate that any number of pistons and associated apertures may be employed without departing from the scope of the invention. For example, in one embodiment, the system may include nine pistons 320, 321 in each of the motor 304 and the pump 302, and nine apertures 314 may pass through the port plate assembly 312. Further, for example, the number of apertures 314 is not dependent on the number of pistons 320, 321, and in some embodiments there may be five apertures 314 when nine pistons 320, 321 are employed. Thus, the number of pistons 320, 321 and the number apertures 314 may be varied without departing from the scope of the invention.

Hydraulic fluid under pressure from the hydraulic pump 302 is delivered to the hydraulic motor 304 through the apertures 314 of port plate assembly 312 for rotating the cylinder block assembly 308 and an output shaft 324 to which the cylinder block assembly 308 is fixedly connected. The swashplate or wobbler 326 of the motor 304 is fixedly configured so that an operating speed of the motor 304 is a function of a displacement of the pump 302. The rotary output from output shaft 324 is added to or subtracted from the rotary motion from the engine through a conventional differential gearing of an integrated drive generator for operating an electrical generator at a substantially constant rotational speed. That is, since the speed of the rotation from the aircraft engine to the input shaft 318 of the hydraulic unit 300 will vary, the position of the variable wobbler 322 is adjusted in response to these detected speed variations for providing the necessary reduction or increase in the rotational speed for obtaining a desired constant output speed to the generator. A control cylinder 340 coupled to the port plate assembly 312 also applies pressure to hydraulic fluid in the port plate assembly 312 to control pressure variations across a range of speeds of the input shaft 318. During normal operation, there is a hydrostatic balance of the cylinder block assemblies 306, 308 and port plate assembly 312. Although the hydraulic unit 300 illustrated and described herein refers to the variable unit as a pump 302 and the fixed unit as a motor 304, hydraulic units having other configurations, such as where the variable unit functions as a motor and the hydraulic unit operates as a pump for example, are within the scope of the invention.

During operation, the wobbler 322 is permitted to turn, rotate, tumble, and/or wobble about a retainer ball 328. The wobbler 322 is configured to wobble, etc., in part, as a result of the movement of the pistons 320, 321, respectively. A retainer ball 330 is configured to turn or rotate with respect to the wobbler 326. Each piston 320, 321 has a ball 332 (ball of piston 320 not labeled for clarity) on one end. The ball 332 of the pistons 320, 321 is retained within a slipper 334. The slipper 334 is retained by a slipper retainer 336. The slipper retainer 336 enables the slipper 334 to be held in contact with the wobbler 322, 326, thus enabling operational coupling and/or contact between the wobblers 322, 326 and the pistons 320, 321, respectively, of the pump 302 and the motor 304.

Figure 4:
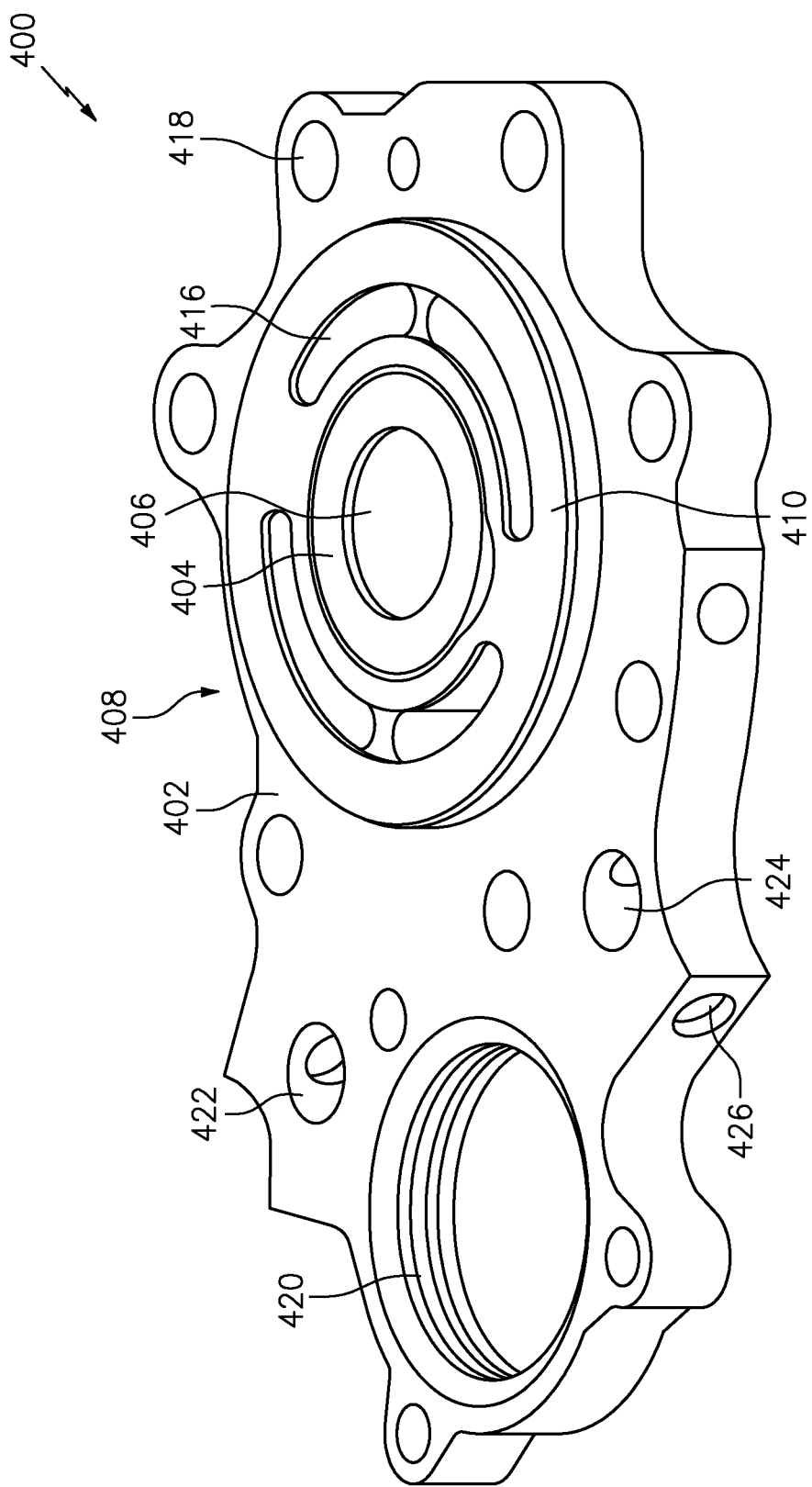
FIG. 4 is a perspective view of a port plate assembly of the hydraulic unit of FIG. 3 in accordance with an embodiment of the invention.
Figure 6:
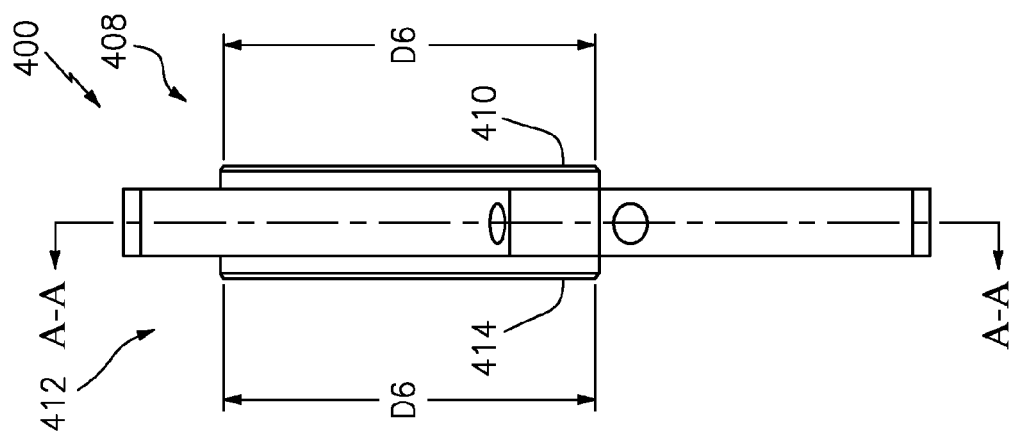
FIG. 6 is a side view of the port plate assembly of FIG. 4.

Turning now to FIG. 4, a perspective view of a port plate assembly 400 of a hydraulic unit is depicted in accordance with an embodiment of the invention. The port plate assembly 400 is an example of the port plate assembly 312 in the hydraulic unit 300 of FIG. 3. The port plate assembly 400 includes a port plate 402 and a journal bearing 404 installed in a central bore 406 of the port plate 402. The journal bearing 404 provides an interface for a fixed-speed shaft and a variable-speed shaft of a hydraulic unit, such as variable-speed input shaft 318 and fixed-speed output shaft 324 of the hydraulic unit 300 of FIG. 3. In FIG. 4, a variable-speed interface side 408 of the port plate 402 is depicted having a variable-speed interface surface 410. The variable-speed interface surface 410 can interface with the cylinder block assembly 306 of FIG. 3, where a hydrostatic balance is achieved between the cylinder block assembly 306 and the variable-speed interface surface 410. Similarly, the port plate 402 includes a fixed-speed interface side 412 having a fixed-speed interface surface 414, as best seen in FIG. 6. A plurality of kidney-shaped apertures 416 are defined about the central bore 406 of the port plate 402 between the fixed-speed interface surface 414 and the variable-speed interface surface 410.

The port plate 402 also includes a plurality of fastener holes 418 to install the port plate assembly 400 in relation to other components in the hydraulic unit 300 of FIG. 3. The port plate 402 further includes a control cylinder interface 420 that can interface with the control cylinder 340 of FIG. 3. Multiple oil transfer ports, such as a first oil transfer port 422 and a second oil transfer port 424, provide fluid communication paths to a plurality of the kidney-shaped apertures 416. Seal ports 426 can be formed at seal port ends as part of the machining process of the port plate 402. The seal ports 426 can be plugged to prevent fluid leakage therefrom.

Figure 5:
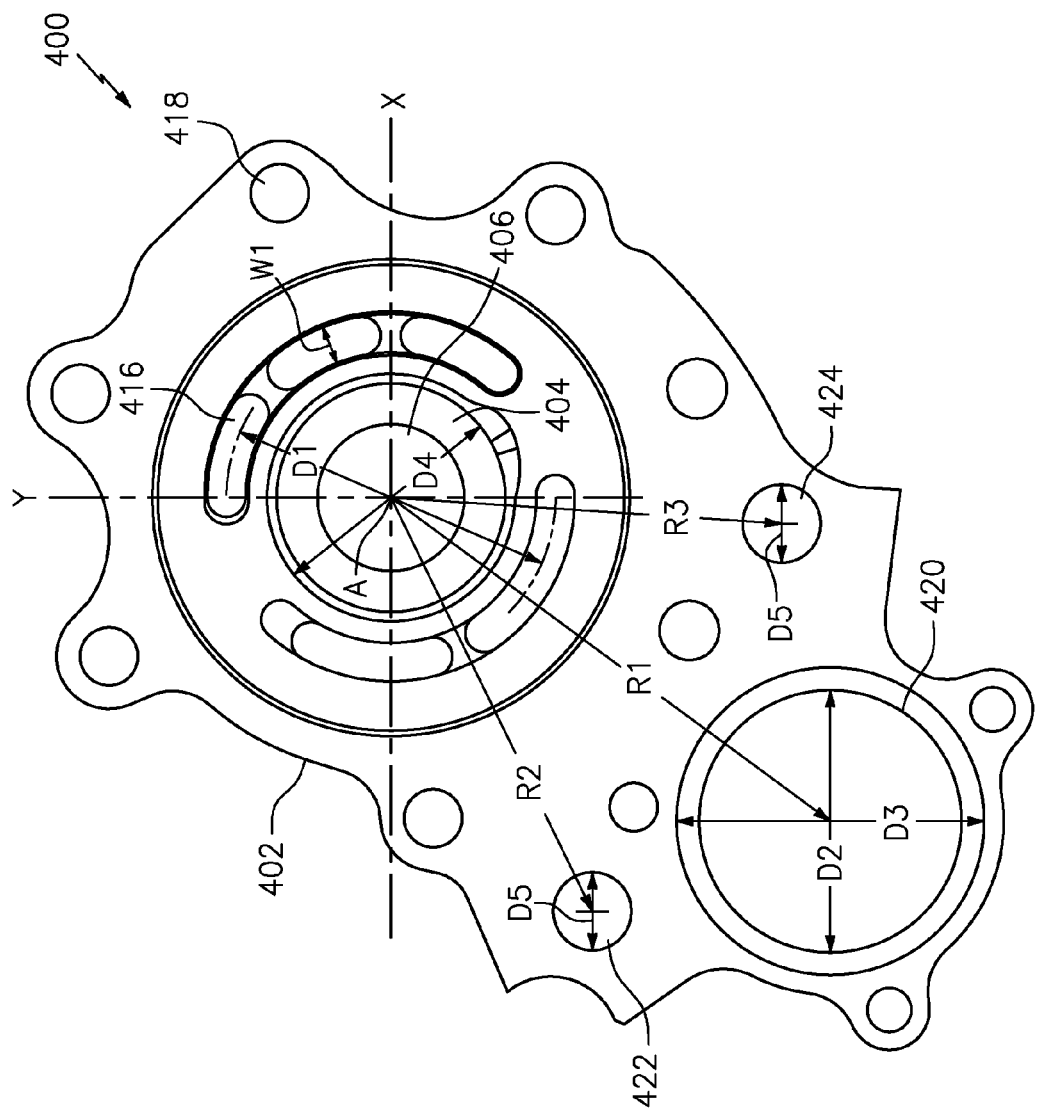
FIG. 5 is a plan view of the port plate assembly of FIG. 4.

FIG. 5 is a plan view of the port plate assembly 400 of FIG. 4. The kidney-shaped apertures 416 are defined at a kidney pitch diameter D1 about the central axis A of the central bore 406 of the port plate 402. Each of the kidney-shaped apertures 416 has an aperture width W1. The control cylinder interface 420 is formed at a control cylinder radial offset R1 from the central axis A of the central bore 406. The control cylinder interface 420 includes an inner cylinder interface diameter D2 and an outer cylinder interface diameter D3. The central bore 406 has a bore diameter D4 in which the journal bearing 404 is installed. The first oil transfer port 422 is defined at a first oil transfer port radial offset R2 from the central axis A of the central bore 406. The second oil transfer port 424 is defined at a second oil transfer port radial offset R3 from the central axis A of the central bore 406. The first oil transfer port 422 and the second oil transfer port 424 have a transfer port diameter D5.

An X-axis and a Y-axis can be defined orthogonally through the central axis A as depicted in FIG. 5. In an embodiment, the kidney pitch diameter D1 is about 1.592 inches (4.044 cm), and the kidney-shaped apertures 416 have an aperture width W1 of about 0.186 inches (0.472 cm). The control cylinder radial offset R1 is about 2.601 inches (6.608 cm), and can be located about 1.549 inches (3.934 cm) offset from the Y-axis and about 2.090 inches (5.309 cm) offset from the X-axis. The inner cylinder interface diameter D2 is about 1.253 inches (3.183 cm), and the outer cylinder interface diameter D3 is about 1.461 inches (3.711 cm). The first oil transfer port radial offset R2 is about 2.181 inches (5.540 cm), and can be located about 1.957 inches (4.971 cm) offset from the Y-axis and about 0.963 inches (2.446 cm) offset from the X-axis. The second oil transfer port radial offset R3 is about 1.873 inches (4.758 cm), and can be located about 0.128 inches (0.325 cm) offset from the Y-axis and about 1.869 inches (4.747 cm) offset from the X-axis. The bore diameter D4 is about 1.172 inches (2.977 cm). The transfer port diameter D5 is about 0.3755 inches (0.954 cm).

FIG. 6 is a side view of the port plate assembly 400 of FIG. 4. As can be seen in FIG. 6, the variable-speed interface side 408 and the fixed-speed interface side 412 are arranged on opposite sides of the port plate assembly 400. The variable-speed interface surface 410 of the variable-speed interface side 408 provides a substantially flat surface to establish hydraulic balance with a balance land of the cylinder block assembly 306 of FIG. 3. Similarly, the fixed-speed interface surface 414 of the fixed-speed interface side 412 provides a substantially flat surface to establish hydraulic balance with a balance land of the cylinder block assembly 308 of FIG. 3. The fixed-speed interface surface 414 and the variable-speed interface surface 410 have an outer surface diameter D6. In an embodiment, the outer diameter surface D6 is about 2.290 inches (5.817 cm).

Figure 7:
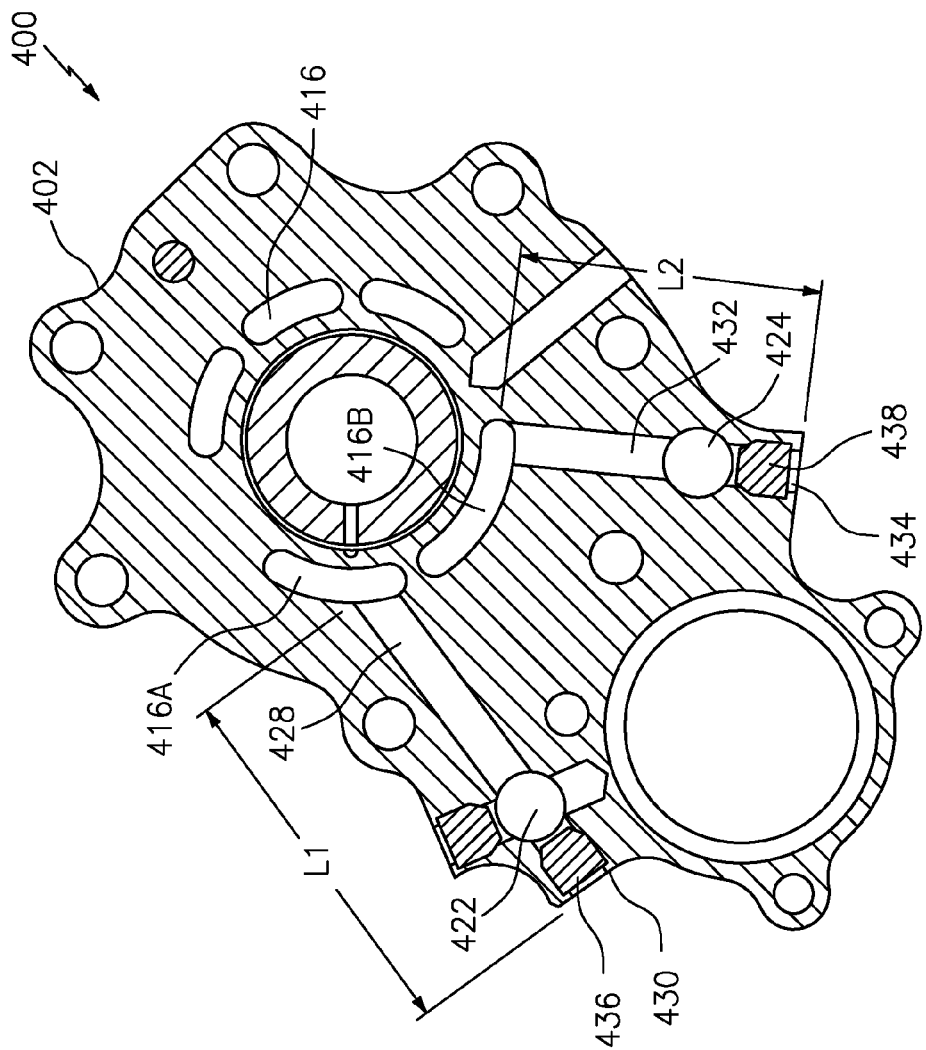
FIG. 7 is a cross-sectional schematic view of the port plate assembly of FIG. 4 taken at section A-A of FIG. 6.

FIG. 7 is a cross-sectional schematic view of the port plate assembly 400 of FIG. 4 taken at section A-A of FIG. 6. As can be seen in FIG. 7, the port plate 402 also includes a first oil channel 428 defined between a first kidney-shaped aperture 416A of the kidney-shaped apertures 416 and a first seal port end 430. The first oil channel 428 is in fluid communication with the first oil transfer port 422. The first oil channel 428 has a first channel length L1. A second oil channel 432 is defined between a second kidney-shaped aperture 416B of the kidney-shaped apertures 416 and a second seal port end 434. The second oil channel 432 is in fluid communication with the second oil transfer port 424. The second oil channel 432 has a second channel length L2. A first sealing plug 436 can be installed at the first seal port end 430, and a second sealing plug 438 can be installed at the second seal port end 434. In an embodiment, the first channel length L1 is about 1.975 inches (5.017 cm), and the second channel length L2 is about 1.613 inches (4.097 cm).

A number of ratios are defined between multiple features of the port plate assembly 400 of FIGS. 4-7. In an embodiment, a ratio of the control cylinder radial offset R1 to the kidney pitch diameter D1 is between 1.629 and 1.639. A ratio of the outer cylinder interface diameter D3 to the inner cylinder interface diameter D2 is between 1.156 and 1.176. A ratio of the outer surface diameter D6 to the kidney pitch diameter D1 is between 1.437 and 1.440. A ratio of the outer surface diameter D6 to the bore diameter D4 is between 1.952 and 1.956. A ratio of the control cylinder radial offset R1 to the first oil transfer port radial offset R2 is between 1.188 and 1.198. A ratio of the control cylinder radial offset R1 to the first channel length L1 is between 1.311 and 1.324. A ratio of the control cylinder radial offset R1 to the second oil transfer port radial offset R3 is between 1.382 and 1.396. A ratio of the control cylinder radial offset R1 to the second channel length L2 is between 1.594 and 1.632. A ratio of the transfer port diameter D5 to the aperture width W1 is between 1.992 and 2.047.

A method of installing a port plate assembly in a hydraulic unit, such as the port plate assembly 400 of FIG. 4 into the hydraulic unit 300 of FIG. 3, includes arranging a first cylinder block assembly 306 of a variable displacement hydraulic pump 302 proximate to a variable-speed interface surface 410 of a variable-speed interface side 408 of a port plate 402 of the port plate assembly 400. A variable-speed shaft, such as variable-speed input shaft 318 of FIG. 3, is interfaced to a journal bearing 404 in a central bore 406 of the port plate 402. A second cylinder block assembly 308 of a fixed displacement hydraulic motor 304 is arranged proximate a fixed-speed interface surface 414 of a fixed-speed interface side 412 of the port plate 402, where kidney-shaped apertures 416 are defined at a kidney pitch diameter D1 about the central bore 406 between the fixed-speed interface surface 414 and the variable-speed interface surface 410. A fixed-speed shaft, such as fixed-speed output shaft 324 of FIG. 3, is interfaced to the journal bearing 404. A control cylinder 340 is coupled to a control cylinder interface 420 formed at a control cylinder radial offset R1 from a central axis A of the central bore 406. A first sealing plug 436 can be installed at the first seal port end 430 of the port plate 402, a second sealing plug 438 can be installed at the second seal port end 434 of the port plate 402, and additional sealing plugs can be installed as needed. Sealing plugs may be installed prior to interfacing and arranging the port plate assembly 400 with respect to other components of the hydraulic unit 300 of FIG. 3.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments.

Accordingly, the invention is not to be seen as limited by the foregoing description, but is only limited by the scope of the appended claims.

What is claimed is:

1. A port plate assembly of a hydraulic unit, the port plate assembly comprising:
    a port plate comprising:
        a fixed-speed interface side having a fixed-speed interface surface;
        a variable-speed interface side having a variable-speed interface surface;
        a plurality of kidney-shaped apertures defined at a kidney pitch diameter about a central bore of the port plate between the fixed-speed interface surface and the variable-speed interface surface; and
        a control cylinder interface formed at a control cylinder radial offset from a central axis of the central bore, wherein a ratio of the control cylinder radial offset to the kidney pitch diameter is between 1.629 and 1.639, the control cylinder interface comprises an inner cylinder interface diameter and an outer cylinder interface diameter, and a ratio of the outer cylinder interface diameter to the inner cylinder interface diameter is between 1.156 and 1.176; and a journal bearing installed in the central bore of the port plate, the journal bearing providing an interface for a fixed-speed shaft and a variable-speed shaft of the hydraulic unit.

2. The port plate assembly of claim 1, wherein the fixed-speed interface surface and the variable-speed interface surface have an outer surface diameter, and a ratio of the outer surface diameter to the kidney pitch diameter is between 1.437 and 1.440.

3. The port plate assembly of claim 2, wherein the central bore has a bore diameter and a ratio of the outer surface diameter to the bore diameter is between 1.952 and 1.956.

4. The port plate assembly of claim 1, wherein the port plate further comprises a first oil transfer port having a first oil transfer port radial offset from the central axis of the central bore, wherein a ratio of the control cylinder radial offset to the first oil transfer port radial offset is between 1.188 and 1.198.

5. The port plate assembly of claim 4, wherein the port plate further comprises a first oil channel defined between a first kidney-shaped aperture of the kidney-shaped apertures and a first seal port end, the first oil channel in fluid communication with the first oil transfer port, the first oil channel having a first channel length, wherein a ratio of the control cylinder radial offset to the first channel length is between 1.311 and 1.324.

6. The port plate assembly of claim 5, wherein the port plate further comprises a second oil transfer port having a second oil transfer port radial offset from the central axis of the central bore, wherein a ratio of the control cylinder radial offset to the second oil transfer port radial offset is between 1.382 and 1.396.

7. The port plate assembly of claim 6, wherein the port plate further comprises a second oil channel defined between a second kidney-shaped aperture of the kidney-shaped apertures and a second seal port end, the second oil channel in fluid communication with the second oil transfer port, the second oil channel having a second channel length, wherein a ratio of the control cylinder radial offset to the second channel length is between 1.594 and 1.632.

8. The port plate assembly of claim 7, further comprising a first sealing plug installed at the first seal port end and a second sealing plug installed at the second seal port end.

9. The port plate assembly of claim 6, wherein the first oil transfer port and the second oil transfer port have a transfer port diameter, the kidney-shaped apertures have an aperture width, and a ratio of the transfer port diameter to the aperture width is between 1.992 and 2.047.

10. A method of installing a port plate assembly in a hydraulic unit, the method comprising:

arranging a first cylinder block assembly of a variable displacement hydraulic pump proximate a variable-speed interface surface of a variable-speed interface side of a port plate of the port plate assembly;

interfacing a variable-speed shaft to a journal bearing in a central bore of the port plate;

arranging a second cylinder block assembly of a fixed displacement hydraulic motor proximate a fixed-speed interface surface of a fixed-speed interface side of the port plate, wherein a plurality of kidney-shaped apertures are defined at a kidney pitch diameter about the central bore between the fixed-speed interface surface and the variable-speed interface surface;

interfacing a fixed-speed shaft to the journal bearing; and coupling a control cylinder to a control cylinder interface formed at a control cylinder radial offset from a central axis of the central bore, wherein a ratio of the control cylinder radial offset to the kidney pitch diameter is between 1.629 and 1.639, the control cylinder interface comprises an inner cylinder interface diameter and an outer cylinder interface diameter, and a ratio of the outer cylinder interface diameter to the inner cylinder interface diameter is between 1.156 and 1.176, wherein the control cylinder applies pressure to hydraulic fluid in the port plate assembly to control pressure variations across a range of speeds of the variable-speed shaft.

11. The method of claim 10, wherein the fixed-speed interface surface and the variable-speed interface surface have an outer surface diameter, the central bore has a bore diameter, a ratio of the outer surface diameter to the kidney pitch diameter is between 1.437 and 1.440, and a ratio of the outer surface diameter to the bore diameter is between 1.952 and 1.956.

12. The method of claim 10, wherein the port plate further comprises a first oil transfer port having a first oil transfer port radial offset from the central axis of the central bore, a first oil channel is defined between a first kidney-shaped aperture of the kidney-shaped apertures and a first seal port end, the first oil channel is in fluid communication with the first oil transfer port, the first oil channel having a first channel length, a ratio of the control cylinder radial offset to the first oil transfer port radial offset is between 1.188 and 1.198, and a ratio of the control cylinder radial offset to the first channel length is between 1.311 and 1.324.

13. The method of claim 12, wherein the port plate further comprises a second oil transfer port having a second oil transfer port radial offset from the central axis of the central bore, a second oil channel is defined between a second kidney-shaped aperture of the kidney-shaped apertures and a second seal port end, the second oil channel is in fluid communication with the second oil transfer port, the second oil channel having a second channel length, a ratio of the control cylinder radial offset to the second oil transfer port radial offset is between 1.382 and 1.396, and a ratio of the control cylinder radial offset to the second channel length is between 1.594 and 1.632.

14. The method of claim 13, further comprising:

installing a first sealing plug at the first seal port end; and installing a second sealing plug at the second seal port end.

* * * * *